（12） United States Patent
Tokuyama

(10) Patent No.: US 7,907,422 B2
(45) Date of Patent: Mar. 15, 2011

(54) CARD CASE

(76) Inventor: Kenichi Tokuyama, Ibaraki (JP)

( * ) Notice: Subject to any disclaimer, the term of this patent is extended or adjusted under 35 U.S.C. 154(b) by 0 days.

(21) Appl. No.: 12/578,808

(22) Filed: Oct. 14, 2009

(65) Prior Publication Data

US 2010/0110655 A1    May 6, 2010

Related U.S. Application Data

(63) Continuation of application No. PCT/JP2008/001013, filed on Apr. 17, 2008.

(30) Foreign Application Priority Data

Apr. 20, 2007    (JP) .................................. 2007-112247

(51) Int. Cl.
*H05K 9/00* (2006.01)
(52) U.S. Cl. ........................... 361/816; 361/818; 361/730
(58) Field of Classification Search .................. 361/752, 361/790, 797, 800, 730, 816, 818, 759, 679.31, 361/679.32, 679.01, 679.02; 455/558; 439/159, 439/152, 347, 296, 345
See application file for complete search history.

(56) References Cited

U.S. PATENT DOCUMENTS

| | | | | |
|---|---|---|---|---|
| 4,593,736 | A * | 6/1986 | Morita | 150/147 |
| 7,175,084 | B2 * | 2/2007 | Mennecart et al. | 235/441 |
| 7,337,979 | B2 * | 3/2008 | Takao | 235/492 |
| 2008/0135144 | A1 * | 6/2008 | Brody | 150/113 |
| 2009/0067150 | A1 * | 3/2009 | Ito | 361/818 |

FOREIGN PATENT DOCUMENTS

| | | |
|---|---|---|
| JP | 11-45316 | 2/1999 |
| JP | 3066214 | 11/1999 |
| JP | 2003-291989 A1 | 10/2003 |
| JP | 2006-53761 A1 | 2/2006 |
| JP | P2006-236302 * | 9/2006 |
| JP | 2006-313482 A1 | 11/2006 |
| JP | P 2006-341871 * | 12/2006 |

OTHER PUBLICATIONS

International Search Report for International Application No. PCT/JP2008/001013 dated May 7, 2008.

* cited by examiner

*Primary Examiner* — Hung S Bui
(74) *Attorney, Agent, or Firm* — Kratz, Quintos & Hanson, LLP

(57) ABSTRACT

The present invention provides a card case that can prevent skimming, when a noncontact IC card is sent to a card user from an issuer of it, or carried by the card user. Since metal films, which shield from an electromagnetic wave, are provided in a card main body, it makes prevention of skimming possible, when the noncontact IC card is sent to the card user from the card issuer. The card user peels off a peeling the section by taking off the seal of openings from an adhesive section, and then insert the card main body having the exposed the adhesive section into a card storing section formed in his wallet or commuter pass holder. As a result, skimming of the IC card can be prevented even when it is carried by the card user in his wallet or the commuter pass holder.

9 Claims, 16 Drawing Sheets

CARD CASE

RELATED APPLICATION

This application is a continuation of the International Patent Application No. PCT/JP2008/001013, filed Apr. 17, 2008, which is based on, and claims priority from, Japan Patent Application 2007-112247, filed Apr. 20, 2007. The disclosures of the prior applications are herein incorporated by reference in their entireties.

BACKGROUND OF THE INVENTION

The present invention relates to a card case that can prevent skimming.

BACKGROUND ART

In recent years, noncontact IC (Integrated Circuit) cards have been widely employed for tickets of various transportation facilities, electronic money cards, credit cards, employee ID cards, and the like.

The noncontact IC card includes an antenna coil and an IC chip, and reads and writes data or programs between external devices such as a card reader/writer and itself by using electromagnetic waves without contact.

A specific operation is as follows: when the external devices change the magnetic flux, which passes through the antenna coil built in the noncontact IC card, with time, an induced electromotive force is generated in the antenna coil. The noncontact IC card processes information by the IC chip by using the induced electromotive force as driving power. In addition, the noncontact IC card exchanges information with external devices such as a card reader/writer through electromagnetic waves by the antenna coil.

Since the noncontact IC card reads and writes data or programs by using electromagnetic waves as described above, there is a problem in that data may be skimmed or falsified from the outside.

Specifically, when the noncontact IC card is sent to a card user from a card issuer by mail, there is a risk that data stored in the IC chip is read out by an external device such as a card reader. Accordingly, there is a possibility that the data is improperly used. In particular, when the noncontact IC card is sent by mail, an address or a name is identified, so that a card user is easily identified. Accordingly, there is a high possibility that the data on the noncontact IC card could be easily used improperly. Further, when a card user carries the noncontact IC card while the noncontact IC card is contained in a wallet or the like, there is also a possibility that data is read just by making the noncontact IC card approach an external device such as a card reader.

There are the following techniques as techniques relating to these problems. There is a technique that shields from electromagnetic waves transmitted from the outside when a noncontact IC card is sent to a card user from a card issuer, by enclosing an electromagnetic wave shielding sheet 5 such as a metal sheet in a delivery envelope 6 together with a noncontact IC card 1 and a card mount 2 for supporting the noncontact IC card (for example, see Japanese Utility Model Registration No. 3066214 (paragraph [0018], FIG. 1)). Further, there is disclosed a technique that shields from electromagnetic waves transmitted from the outside by storing one folded card 8 or one card 2, which has an electromagnetic wave shielding effect, in an existing storage case 4 or a folding storage case 5 together with a noncontact IC card 3 (see Japanese Laid-Open Patent Publication 2006-313482 (paragraphs [0017] and [0029], FIGS. 2 and 7)).

SUMMARY OF THE INVENTION

A delivery envelope disclosed in Japanese Utility Model Registration No. 3066214 can shield from electromagnetic waves transmitted from the outside when the noncontact IC card is sent to the card user from the card issuer. However, it is not supposed that electromagnetic waves transmitted from the outside are shielded when the card user thereafter carries the noncontact IC card. Accordingly, the card user needs to purchase separately a wallet or a commuter pass holder, which has an electromagnetic waves shielding effect, in order to prevent data from being skimmed or falsified from the outside. Alternatively, the card user needs to separately purchase one card that is disclosed in Japanese Laid-Open Patent Publication 2006-313482 and has an electromagnetic waves shielding effect, and needs to make the card be contained in an existing wallet or a commuter pass holder.

In consideration of the above-mentioned circumstance, an object of the invention is to provide a card case that can prevent skimming when a noncontact IC card is sent to a card user from an issuer of the noncontact IC card, and can prevent skimming even when the card user carries the noncontact IC card.

In order to achieve the object, a card case according to the invention in which a noncontact IC card including an antenna is contained, comprises a case main body including openings through which the noncontact IC card is taken out of and put in the case main body; shielding parts that are provided in the case main body and shield from electromagnetic waves transmitted and received by the antenna; an adhesive section that is provided on the case main body; and a sealing member that is attached to the adhesive section, is peeled off from the adhesive section, and seals the openings.

The card case according to the invention comprises the shielding parts that shield from electromagnetic waves and are provided in the case main body. Accordingly, it may be possible to prevent skimming when the noncontact IC card is sent to a card user from a card issuer. In addition, since the card case comprises the sealing member sealing the openings, it may be possible to prove that the seal of the openings is not improperly taken off during the sending of the card and skimming is not performed. Further, according to the invention, for example, when being put in a wallet, two cards are put in a wallet while one card is put in the card case according to the invention and the other card is not put in the card case. Accordingly, the card put in the card case does not operate. As a result, the malfunction of the card, which is not put in the card case, is prevented.

The sealing member is attached to the adhesive section provided on the case main body, and can be peeled off from the adhesive section. Accordingly, it may be possible to make the adhesive section be exposed as it is by taking off the seal of the openings.

The card case according to the invention comprises the adhesive section as described above. Accordingly, the card case according to the invention is inserted into, for example, a card storing section of a wallet, so that the adhesive section is attached to the inner surface of the card storing section. As a result, it may be possible to prevent the card case from being deviated from the card storing section of the wallet. Therefore, even when the card user carries the noncontact IC card, it may be possible to prevent skimming.

In the card case, the case main body may include a first edge portion that has a first length and a second edge portion that is adjacent to the first edge portion and has a second length longer than the first length, and the openings may be formed to continue to the first and second edge portions.

Accordingly, when the card case according to the invention is inserted into, for example, the card storing section of the wallet, any one of the first and second edge portions where openings are formed may correspond to an insertion port that is formed at the card storing section of the wallet. For this reason, even though the card storing section of the wallet is formed so that the noncontact IC card is taken out from and put in the card storing section in the longitudinal direction, or even though the card storing section is formed so that the noncontact IC card is taken out from and put in the card storing section in the transverse direction, it may be possible to take out the noncontact IC card from the card storing section and put the noncontact IC card in the card storing section while the card case is inserted into the card storing section of the wallet.

In the card case, the case main body may include a front surface, and the adhesive section may be provided on the front surface and have a shape elongated in a diagonal direction.

In the invention, the adhesive section is diagonally provided on the front surface. Accordingly, it may be possible to attach the adhesive section efficiently to the inner surface of the card storing section regardless of the shape of the card storing section of the wallet even while the area of the adhesive section is reduced.

In the card case, the sealing member may include a peeling section that has the form of a tape attached to the adhesive section, and first and second sealing sections that are formed at the respective first and second edge portions so as to be branched off from the end of the peeling section.

In the card case, the sealing member may include a peeling section that is attached to the adhesive section, a folded-back section that is formed to be folded back from the peeling section, and sealing sections that are formed at the end of the folded-back section and seal the openings.

In the invention, the sealing member includes the peeling section that is attached to the adhesive section, and the folded-back section that is folded back from the peeling section. Accordingly, if the folded-back section is moved in a folded-back direction after the seal of the sealing section is taken off, it may be possible to peel off the peeling section from the adhesive section from the folded-back section. Therefore, it may be possible to peel off the peeling section from the adhesive section after inserting the card case into, for example, the card storing section of the wallet.

In the card case, the case main body may include a corner where the first and second edge portions are connected to each other. Further, the sealing member may include a peeling section that is attached to the adhesive section, a folded-back section that is formed to be diagonally folded back from the peeling section toward the corner and has a shape elongated in the diagonal direction, and sealing sections that are formed at the end of the folded-back section and seal the openings at the corner.

In the invention, the folded-back section is diagonally folded back from the peeling section toward the corner. Accordingly, even though the card storing section of the wallet is formed so that the noncontact IC card is taken out from and put in the card storing section in the longitudinal direction, or even though the card storing section is formed so that the noncontact IC card is taken out from and put in the card storing section in the transverse direction, it may be possible to easily peel off the peeling section from the adhesive section while the card case is inserted into the card storing section of the wallet.

In the card case, the case main body may include a front surface and a rear surface opposite to the front surface, the adhesive section may include a first adhesive section provided on the front surface and a second adhesive section provided on the rear surface, and the sealing member may seal the openings by being folded back from the front surface toward the rear surface and being attached to the first and second adhesive sections.

Accordingly, for example, there is further improved an advantage of preventing the card case from being deviated from the card storing section of the wallet.

In the card case, the case main body may include a first edge portion that has a first length and a second edge portion that is adjacent to the first edge portion and has a second length longer than the first length, and the openings may continue to the first and second edge portions so as to partition the front and rear surfaces.

As described above, according to the invention, it may be possible to provide a card case that can prevent skimming when a noncontact IC card is sent to a card user from an issuer of the noncontact IC card, and can prevent skimming even when the card user carries the noncontact IC card.

DETAILED DESCRIPTION

Embodiments of the present invention will be described below with reference to drawings.

First Embodiment

Figure 1:
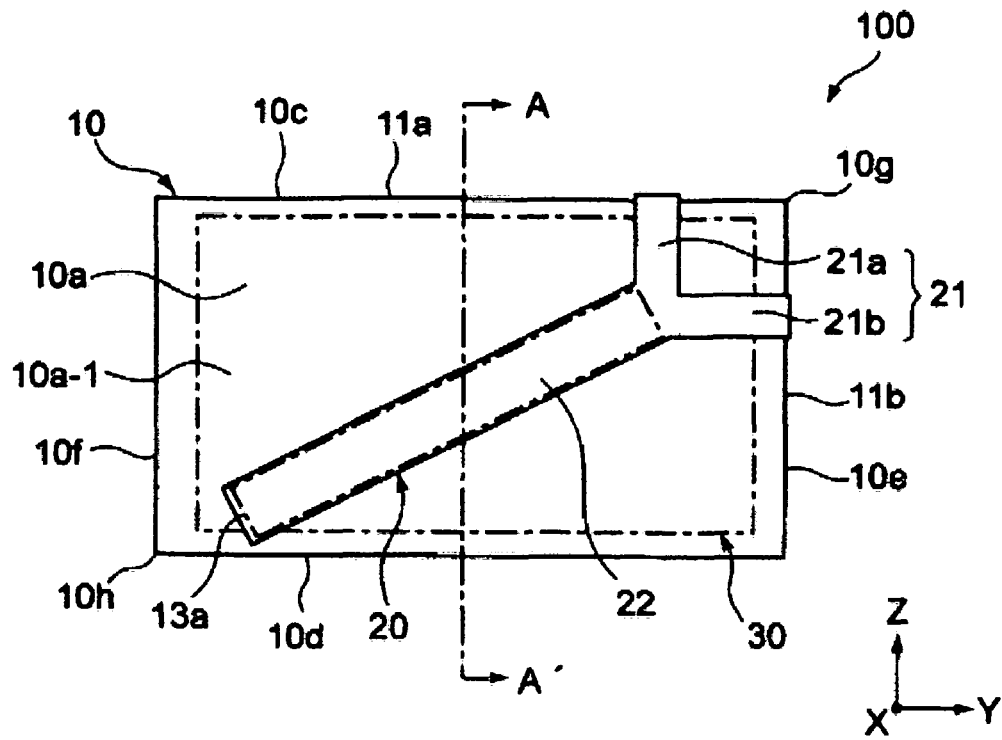
FIG. 1 is a plan view of a card case according to the first embodiment of the present invention.
Figure 2:
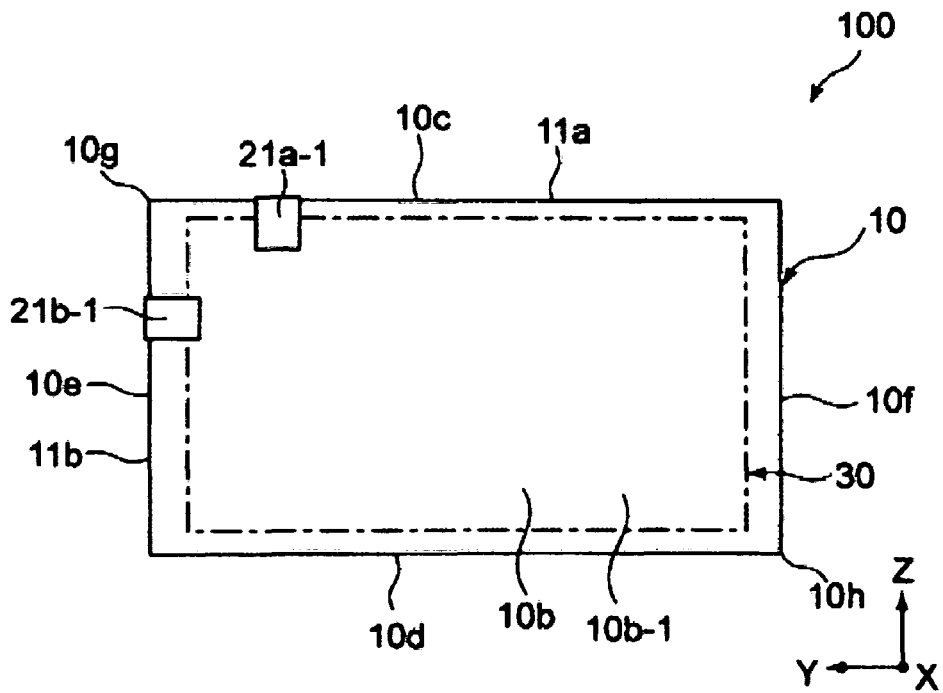
FIG. 2 is a rear view of the card case according to the first embodiment.
Figure 3:
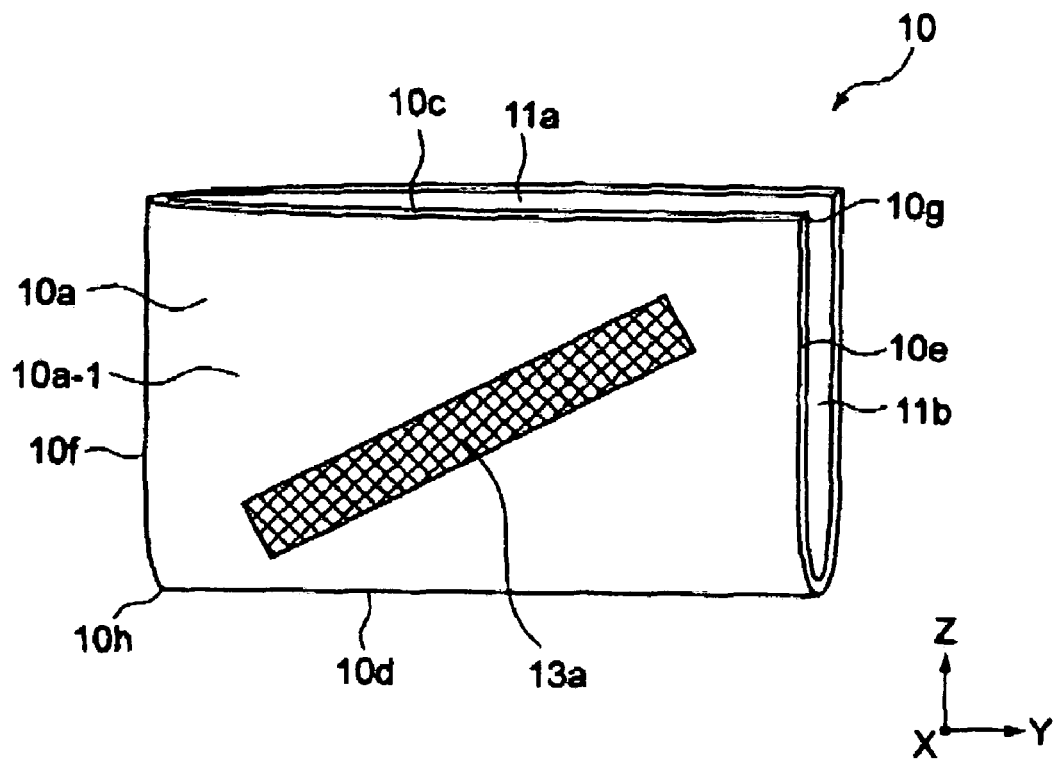
FIG. 3 is a perspective view of a case main body of the first embodiment.
Figure 4:
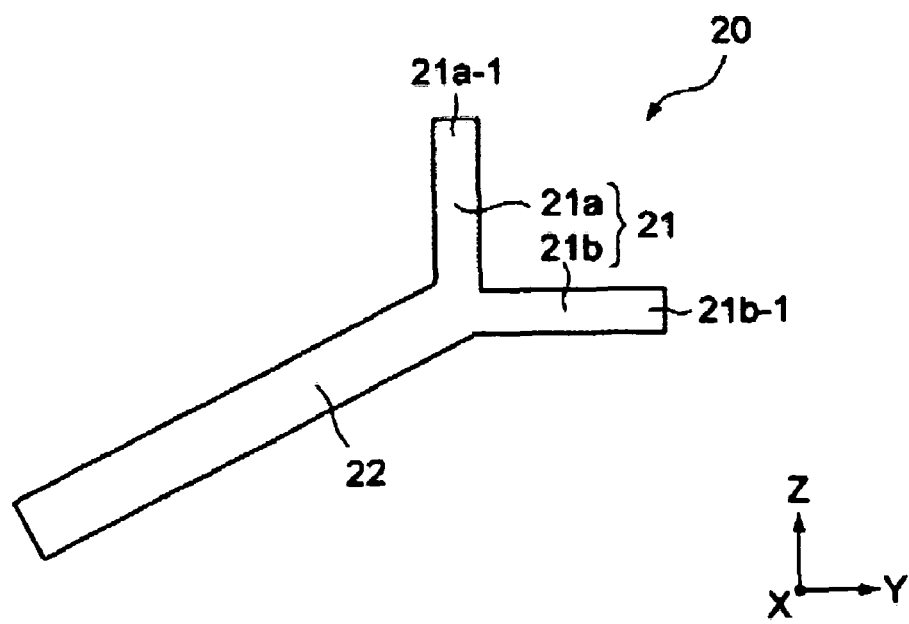
FIG. 4 is a development view of a sealing member of the first embodiment.
Figure 5:
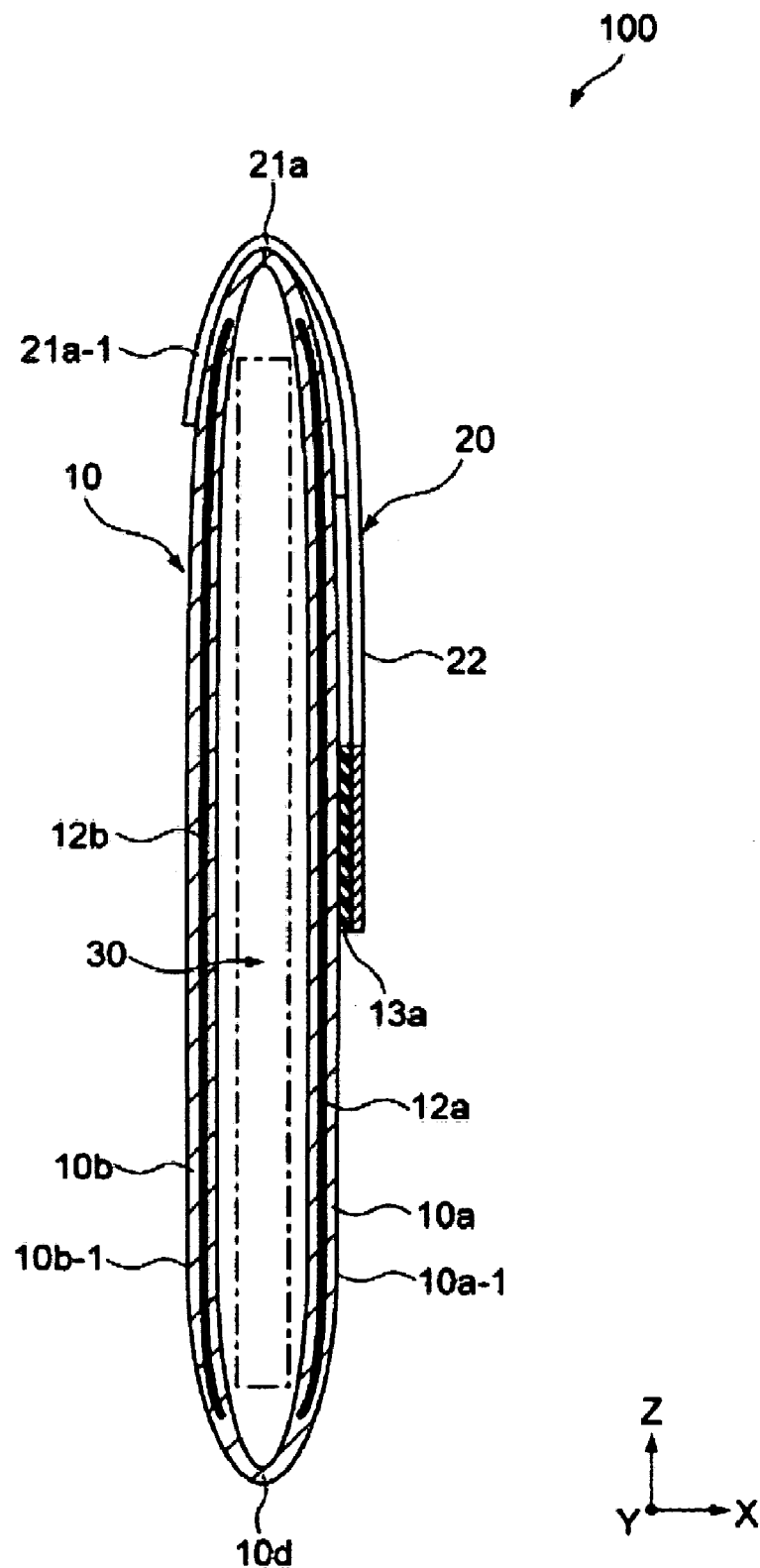
FIG. 5 is a cross-sectional view taken along a line A-A' shown in FIG. 1.
Figure 6:
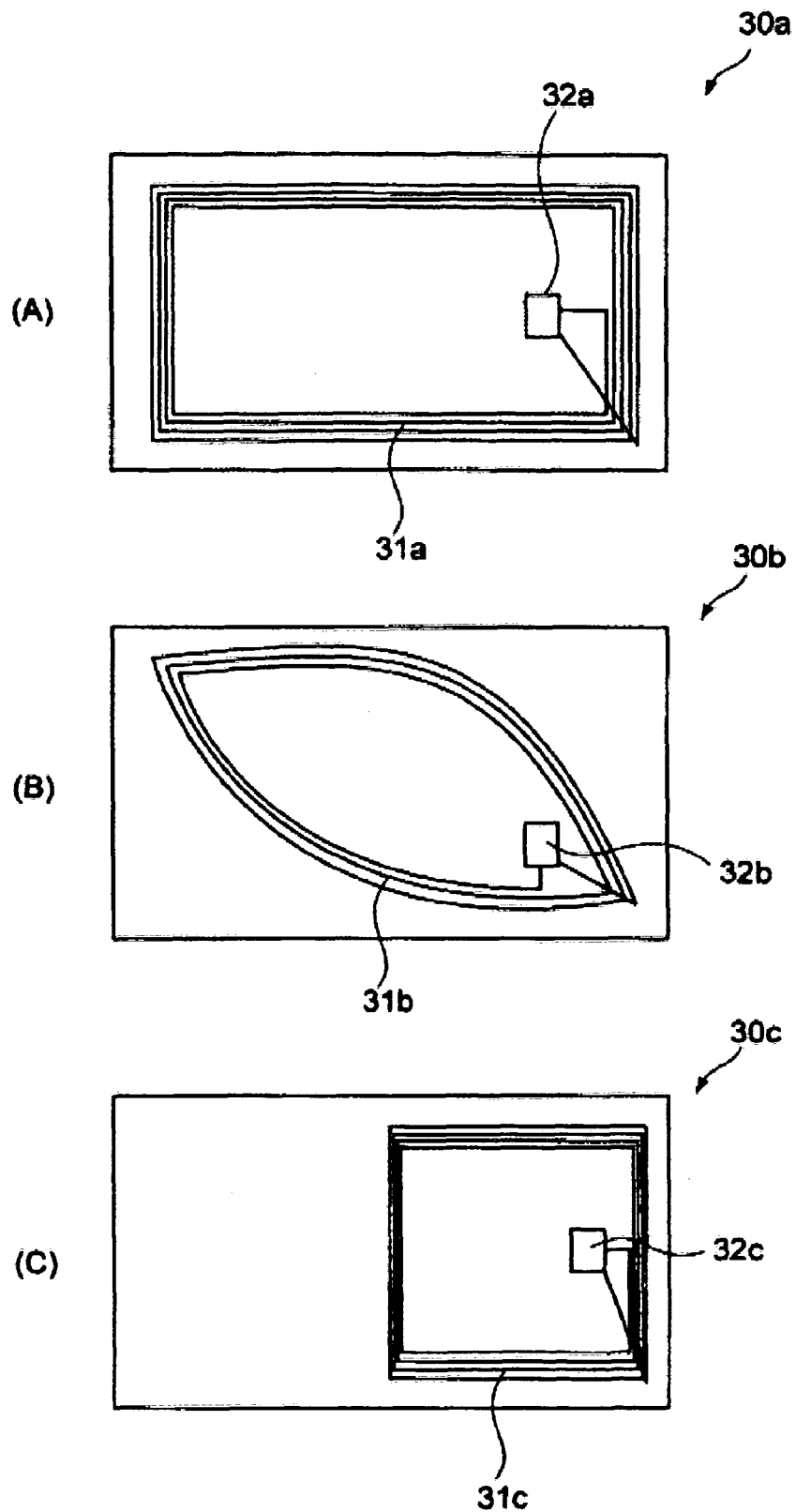
FIG. 6 is a view showing the internal structure of a noncontact IC card contained in the card case according to the first embodiment.

The first embodiment of the present invention will be described. FIG. 1 is a plan view of a card case according to the first embodiment of the invention, FIG. 2 is a rear view of the card case, FIG. 3 is a perspective view of the card case, FIG. 4 is a development view of a sealing member of the card case, FIG. 5 is a cross-sectional view taken along a line A-A' shown in FIG. 1, and FIG. 6 is a view showing the internal structure of a noncontact IC card contained in the card case.

As shown in these drawings, a card case 100 according to this embodiment comprises a case main body 10 and a sealing member 20, and the case main body 10 can contain a noncontact IC card 30.

The case main body 10 is formed in the shape of a substantially rectangular flat plate. The case main body 10 includes a front member 10a, a rear member 10b, an upper edge portion 10c, a lower edge portion 10d, a right edge portion 10e, and a left edge portion 10f. The front and rear members 10a and 10b are continuously connected to each other by the lower and left edge portions 10d and 10f. Openings 11a and 11b are formed to continue to the upper and right edge portions 10c and 10e. The noncontact IC card 30 is taken out of and put in the card case through the openings 11a or 11b.

The case main body 10 is made of a resin material such as vinyl chloride, polyethylene, nylon and the like; fabric using cotton, hemp, or the like; paper; or other materials. The size of the case main body 10 is slightly larger than that of the noncontact IC card 30 in the relationship with the size of a card storing section that is formed in a commuter pass holder or a wallet to be described below.

As shown in FIG. 5, metal films (shielding parts) 12a and 12b, which can shield from an electromagnetic wave, are provided in the front and rear members 10a and 10b.

The metal films are made of silver, copper, aluminum, or other metal. The areas of the metal films are substantially the same as the areas of a front surface 10a-1 (the outer surface of the front member) and a rear surface 10b-1 (the outer surface of the rear member) of the case main body 10.

An adhesive section 13a, which has a shape elongated in a diagonal direction, is provided on the front surface 10a-1 of the case main body 10. Specifically, the adhesive section 13a is provided in a direction toward the second corner 10h from the first corner 10g. The lower and left edge portions 10d and 10f are connected to each other at the second corner 10h, and the upper and right edge portions 10c and 10e are connected to each other at the first corner 10g. The adhesive section 13a is formed of an acrylic resin adhesive, a silicon adhesive, a phenolic resin adhesive, or the like. However, the adhesive section 13a may be an adhesive that can be attached to the inner surface of a card storing section of a wallet to be described below.

As shown in FIG. 4, the sealing member 20 includes a sealing section 21 and a peeling section 22. The peeling section 22 has the form of a tape, and is detachably attached to the adhesive section 13a so as to cover the adhesive section 13a. The sealing section 21 is branched off from an end of the peeling section 22 into the first sealing section 21a and the second sealing section 21b. An end 21a-1 of the first sealing section and an end 21b-1 of the second sealing section are respectively attached to the rear surface 10b-1 of the case main body by, for example, gluing or other adhesive methods. Accordingly, the first and second sealing sections 21a and 21b seal the openings so that the openings 11a and 11b are provided between the upper and right edge portions 10c and 10e, respectively.

The sealing member 20 is made of paper, a resin, or the like. However, if only the sealing member 20 can be detached from the adhesive section 13a, the sealing member 20 may be made of any material.

As shown in FIG. 6A, an antenna coil 31a and an IC chip 32a are built in a noncontact IC card 30a. The antenna coil 31a generates an induced electromotive force, and the IC chip 32a processes information by the induced electromotive force. In addition, the noncontact IC card 30a exchanges information with external devices (not shown) such as a card reader/writer through electromagnetic waves by the antenna coil 31a. Noncontact IC cards 30b and 30c shown in FIGS. 6B and 6C are the same as described above.

As described above, the areas of metal films 12a and 12b are substantially the same as the areas of the front and rear surfaces 10a-1 and 10b-1 of the case main body 10. Accordingly, even though the antenna coil has any shape of the shapes of the antenna coils 31a, 31b, and 31c, it may be possible to shield from electromagnetic waves and prevent skimming. That is, the card case 100 according to this embodiment has high versatility.

The operation and advantages of the card case 100 having the above-mentioned structure will be described below.

While the card case 100 is inserted into, for example, a delivery envelope (not shown) and the delivery envelope is sealed, the card case 100 is sent to a card user from a card issuer. Since the case main body is provided with the metal films 12a and 12b, it may be possible to prevent skimming during the sending of the card.

After the delivery envelope is sent to the card user, the card user takes out the card case 100 from the delivery envelope. As described in this embodiment, the first and second sealing sections 21a and 21b seal the openings 11a and 11b. Accordingly, it may be possible to prove that the seal of the openings 11a and 11b is not improperly taken off during the sending of the card and skimming is not performed.

Figure 7:
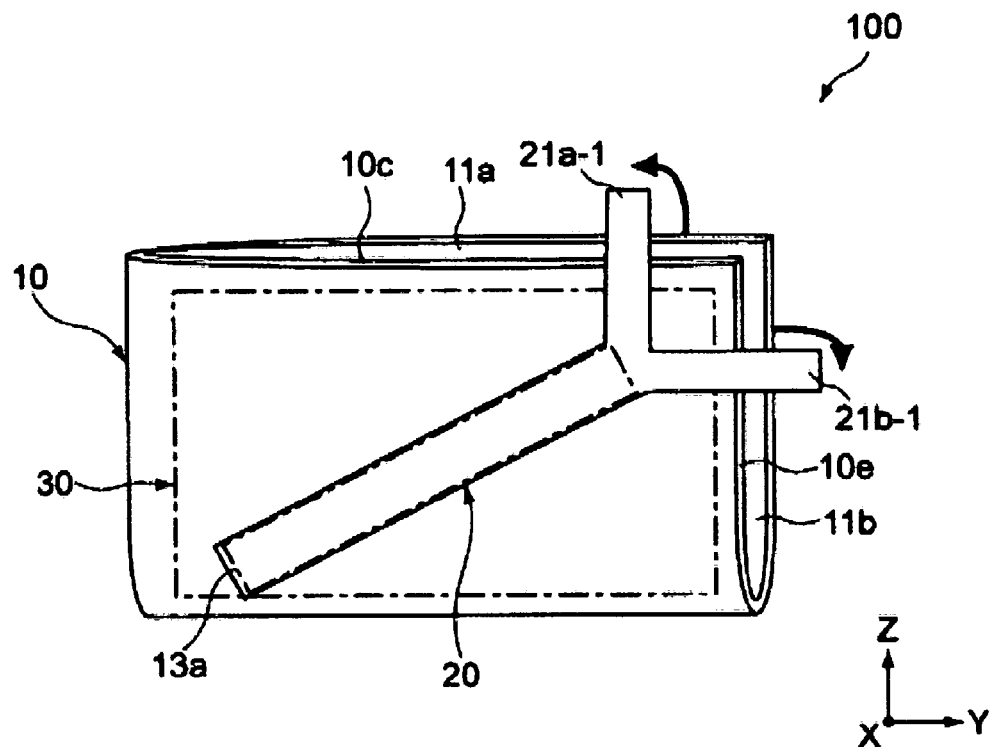
FIG. 7 is a view showing that a card user takes off a seal of openings in the first embodiment.

Then, the card user takes off the seal of the openings 11a and 11b. FIG. 7 is a view showing that the card user takes off the seal of the openings 11a and 11b. As shown in FIG. 7, the card user peels off the end 21a-1 of the first sealing section and the end 21b-1 of the second sealing section, which are attached to the rear surface 10b-1 by gluing or the like, from the rear surface 10b-1, and takes off the seal of the openings 11a and 11b.

Figure 8:
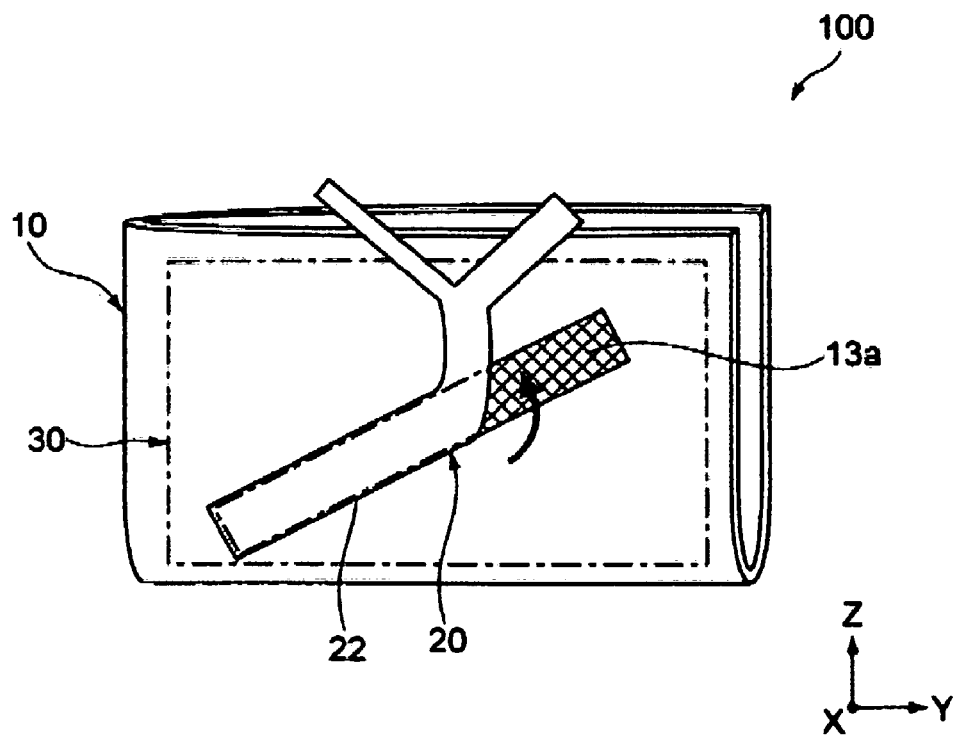
FIG. 8 is a view showing that a card user makes an adhesive section be exposed in the first embodiment.

The first and second sealing sections 21a and 21b are connected to the peeling section 22 that is detachably attached to the adhesive section 13a. Accordingly, it may be possible to peel off the peeling section 22 from the adhesive section 13a as it is by taking off the seal of the openings 11a and 11b and to make the adhesive section 13a be exposed. FIG. 8 shows that the card user makes the adhesive section 13a be exposed.

After making the adhesive section 13a be exposed, the card user inserts the case main body 10 into a card storing section that is formed in an existing wallet or a commuter pass holder.

Figure 9:
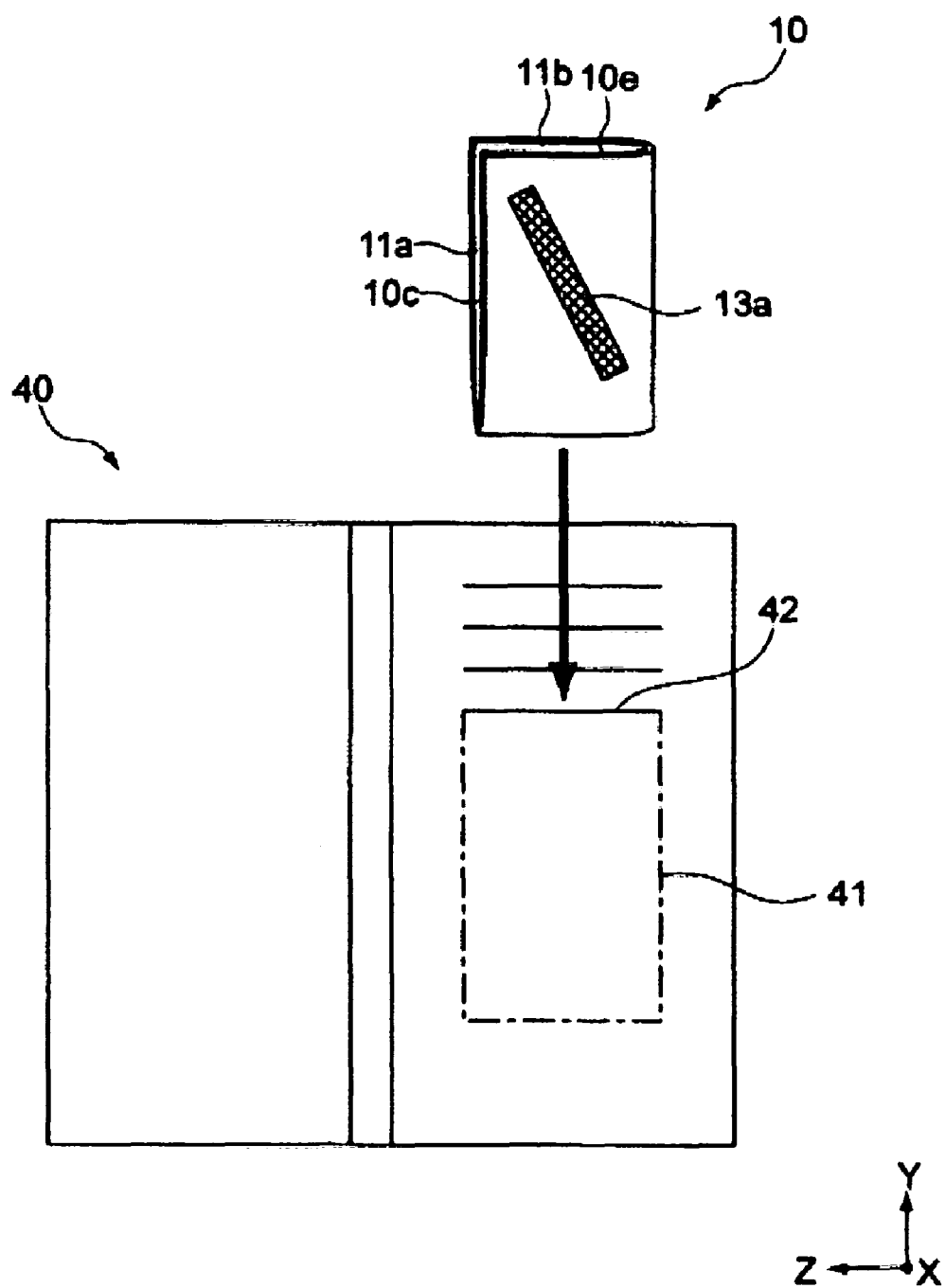
FIG. 9 is a view showing that a card user is inserting a case main body into a wallet, which is formed so that a noncontact IC card is taken out from and put in the wallet in a longitudinal direction, in the first embodiment.
Figure 10:
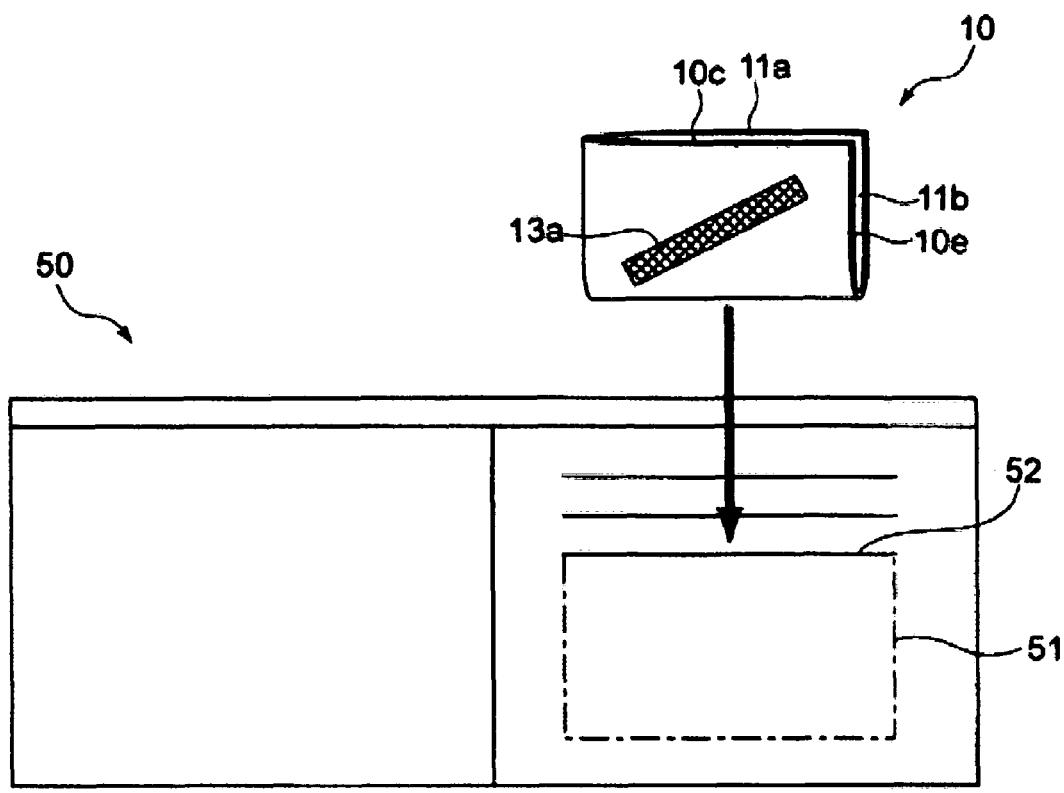
FIG. 10 is a view showing that a card user is inserting a case main body into a wallet, which is formed so that a noncontact IC card is taken out from and put in the wallet in a transverse direction, in the first embodiment.

FIG. 9 is a view showing that the card user is inserting the case main body 10 into a wallet, which is formed so that the noncontact IC card is taken out from and put in the wallet in a longitudinal direction. Further, FIG. 10 is a view showing that the card user is inserting the case main body 10 into a wallet, which is formed so that the noncontact IC card is taken out from and put in the wallet in a transverse direction.

In this embodiment, the size of the case main body 10 is slightly larger than that of the noncontact IC card 30. Accordingly, it may be possible to insert the case main body 10 into card storing sections 41 and 51 that are formed in wallets 40 and 50. Further, openings 11a and 11b are formed at the case main body 10 so as to continue to the upper and right edge portions 10c and 10e. Accordingly, when the case main body 10 is inserted into the wallet 40 that is formed so that the noncontact IC card is taken out from and put in the wallet in the longitudinal direction, it may be possible to make the opening 11b formed at the right edge portion 10e correspond to an insertion port 42 formed at the card storing section 41. Meanwhile, when the case main body 10 is inserted into the wallet 50 that is formed so that the noncontact IC card is taken out from and put in the wallet in the transverse direction, it may be possible to make the opening 11a formed at the upper edge portion 10c correspond to an insertion port 52 formed at the card storing section 51. That is, even though the card storing section is formed so that the noncontact IC card is taken out from and put in the card storing section in the longitudinal direction, or even though the card storing section is formed so that the noncontact IC card is taken out from and put in the card storing section in the transverse direction, it may be possible to take out the noncontact IC card 30 from the card storing section and put the noncontact IC card 30 in the card storing section while the case main body 10 is inserted into the card storing section.

When the case main body 10 is contained in the card storing section 41 or 51, the adhesive section 13a is attached to the inner surface of the card storing section 41 or 51. Accordingly, it may be possible to prevent the case main body 10 from being deviated from the card storing section 41 or 51. In this embodiment, in particular, the adhesive section 13a is formed to have a shape elongated in the diagonal direction (in the direction facing the second corner 10h from the first corner 10g). Accordingly, it may be possible to attach the adhesive section 13a efficiently to the inner surface of the card storing section 41 or 51 regardless of the shape of the card storing section 41 or 51 even while the area of the adhesive section 13a is reduced.

Since it may be possible to insert the case main body 10 into the card storing section 41 or 51 that is formed at the existing wallet 40 or 50 or the commuter pass holder as described above, it may be possible to prevent skimming even when the card user carries the noncontact IC card 30 by the wallet 40 or the like.

Second Embodiment

The second embodiment of the present invention will be described below. The same members or functions as those of the card case 100 according to the first embodiment are briefly described or not described in the following description, and the difference between the first and second embodiments will be mainly described.

Figure 11:
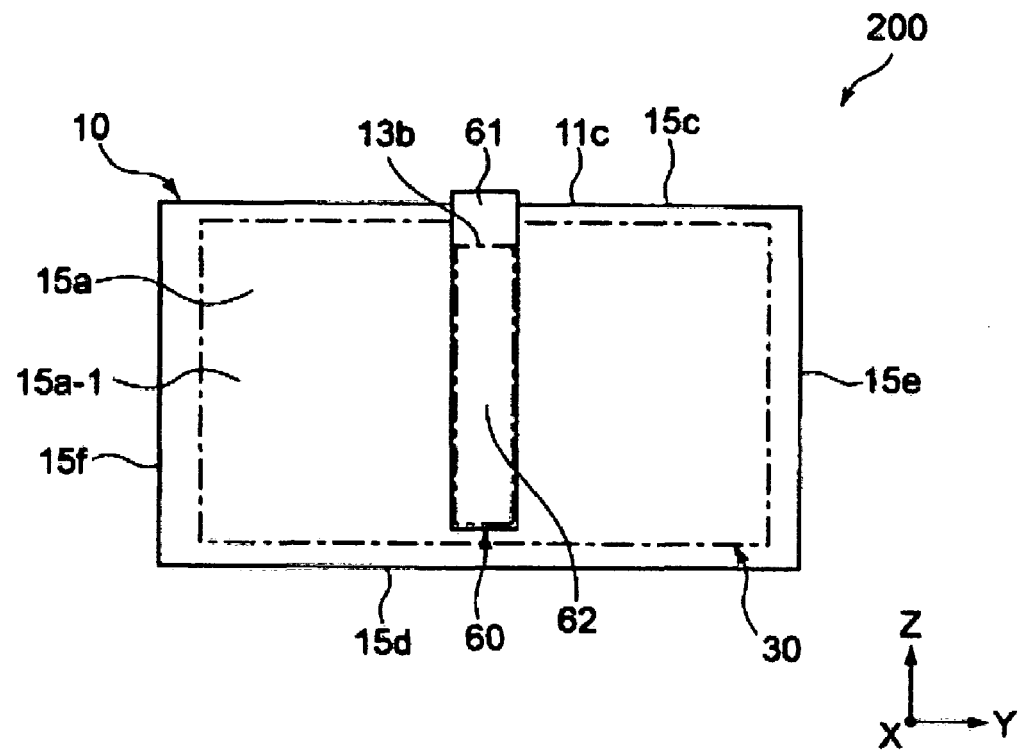
FIG. 11 is a plan view of a card case according to the second embodiment of the present invention.
Figure 12:
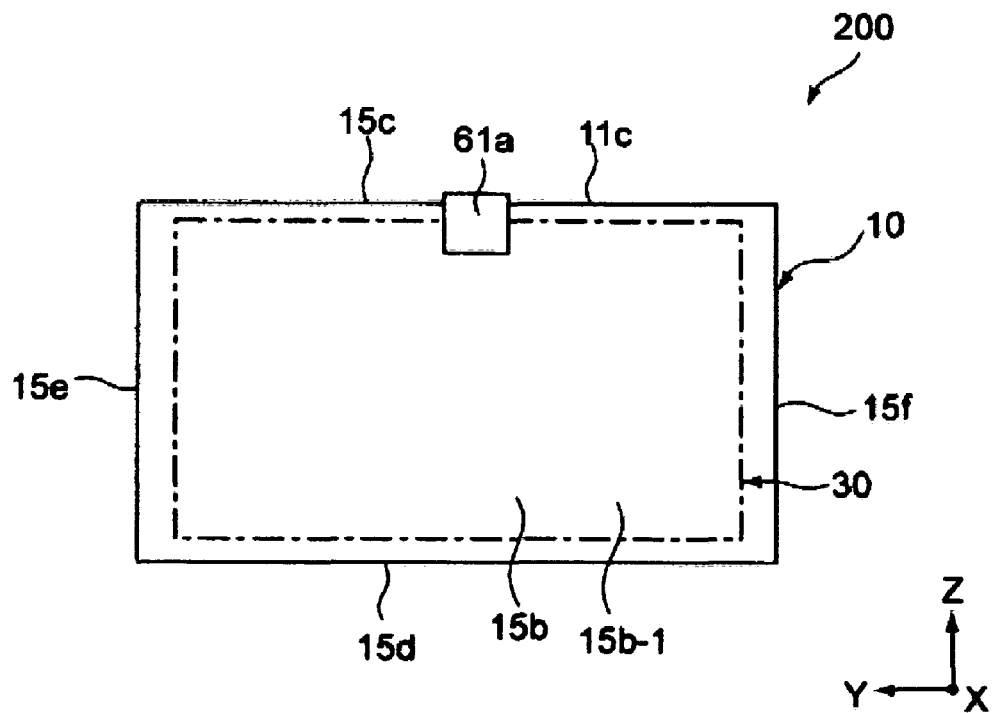
FIG. 12 is a rear view of the card case according to the second embodiment.

FIG. 11 is a plan view of a card case according to this embodiment, and FIG. 12 is a rear view of the card case.

As shown in these drawings, a card case 200 according to this embodiment comprises a case main body 15 and a sealing member 60, and the case main body 15 can contain the noncontact IC card 30.

In the case main body 15, a front member 15a and a rear member 15b are continuously connected to each other by a lower edge portion 15d, a right edge portion 15e, and a left edge portion 15f. An opening 11c is formed at only an upper edge portion 15c.

An adhesive section 13b, which has a shape elongated in a direction (Z direction) facing the upper edge portion 15c from the lower edge portion 15d, is provided on a front surface 15a-1 of the case main body 15.

A peeling section 62 of the sealing member 60 is detachably attached to the adhesive section 13b so as to cover the adhesive section 13b. An end 61a of the sealing section 61 of the sealing member 60 is attached to a rear surface 15b-1 of the case main body by, for example, gluing or the like.

The card user can make the adhesive section 13b be exposed by peeling off the end 61a of the sealing section from the rear surface 15b-1 of the case main body and peeling off the peeling section 62 from the adhesive section 13b as it is. It may be possible to prevent skimming by inserting the case main body 10 into, for example, the wallet 50 shown in FIG. 10 after the adhesive section 13b is exposed.

Meanwhile, the card case 200 includes one adhesive section 13b and one sealing member 60 in this embodiment. However, the card case 200 may include two or more adhesive sections and two or more sealing members corresponding to the adhesive sections.

The opening 11c has been formed at only the upper edge portion 15c in this embodiment. However, an opening may be formed at only the right edge portion 15e (or the left edge portion 15f).

Third Embodiment

The third embodiment of the present invention will be described below.

Figure 13:
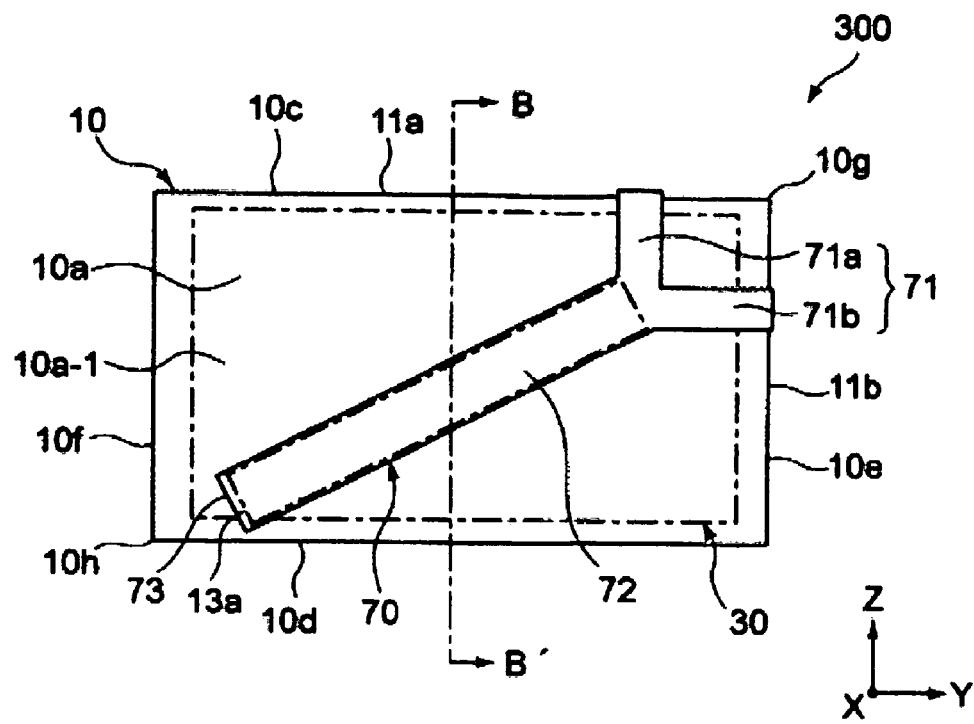
FIG. 13 is a plan view of a card case according to the third embodiment of the present invention.
Figure 14:
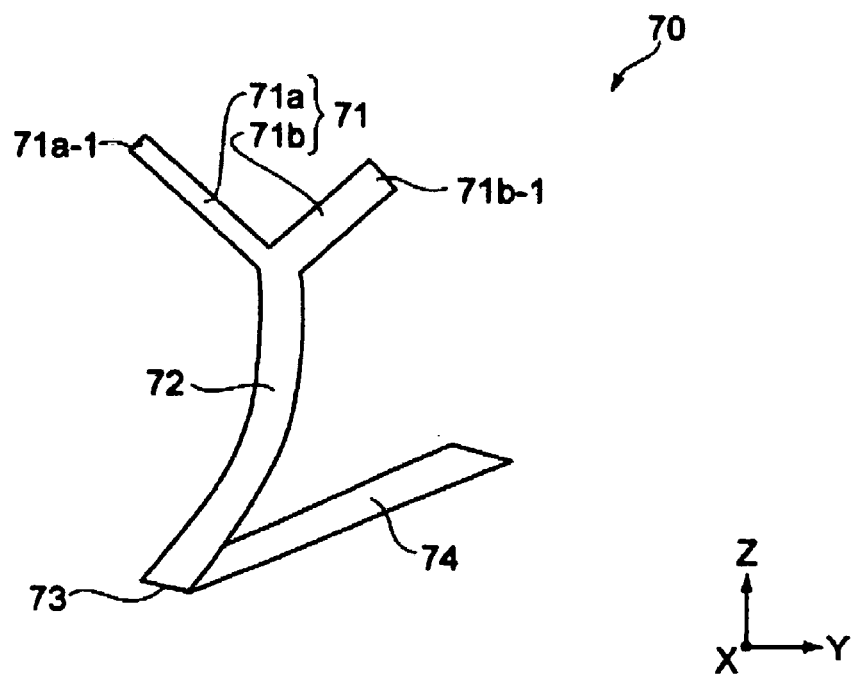
FIG. 14 is a development view of a sealing member of the card case according to the third embodiment.
Figure 15:
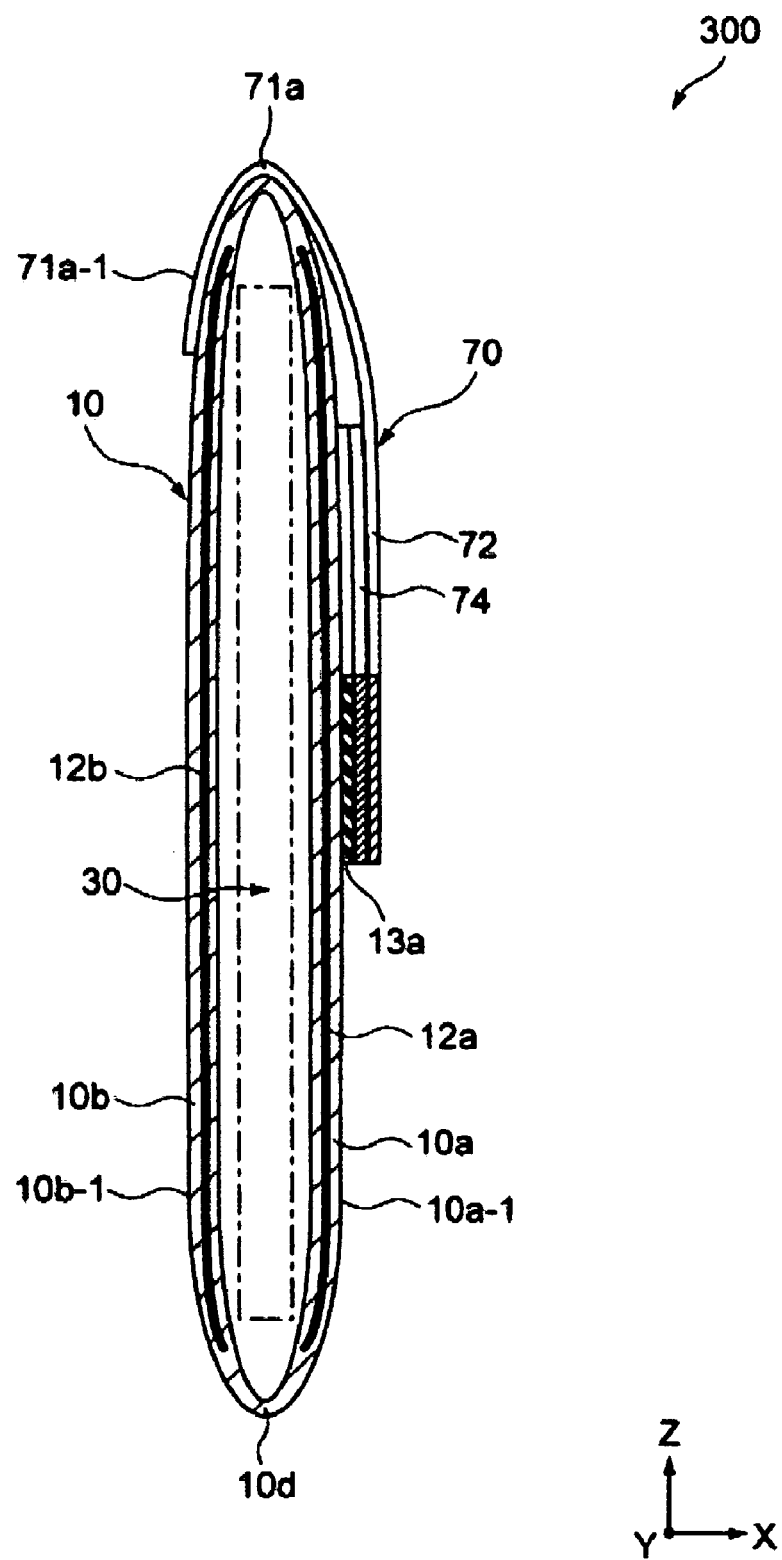
FIG. 15 is a cross-sectional view taken along a line B-B' shown in FIG. 13.

FIG. 13 is a plan view of a card case according to this embodiment, FIG. 14 is a development view of a sealing member of the card case, and FIG. 15 is a cross-sectional view taken along a line B-B' shown in FIG. 13.

As shown in these drawings, a card case 300 according to this embodiment comprises the case main body 10 of the first embodiment and a sealing member 70.

In particular, since the sealing member 70 of this embodiment is different from the sealing member of the above-mentioned first embodiment, the sealing member 70 will be mainly described.

As shown in the development view of FIG. 14, the sealing member 70 has the form of a tape and includes a peeling section 74, a folded-back section 72, and a sealing section 71.

The peeling section 74 is detachably attached to the adhesive section 13a so as to cover the adhesive section 13a that is provided on the front surface 10a-1 of the case main body and has a shape elongated in a diagonal direction (in a direction facing the second corner 10h from the first corner 10g). The folded-back section 72 is folded back from the peeling section 74 by a folding line 73. Specifically, the folded-back section 72 is folded back so as to overlap the peeling section 74 in a direction facing the first corner 10g of the case main body from the second corner 10h in the vicinity of the second corner 10h of the case main body. First and second sealing sections 71a and 71b are formed so as to be branched off from the end of the folded-back section 72. An end 71a-1 of the first sealing section and an end 71b-1 of the second sealing section are attached to the rear surface 10b-1 of the case main body by, for example, gluing or the like. Accordingly, the first and second sealing sections 71a and 71b seal the openings so that the openings 11a and 11b are provided between the upper and right edge portions 10c and 10e, respectively.

Figure 16:
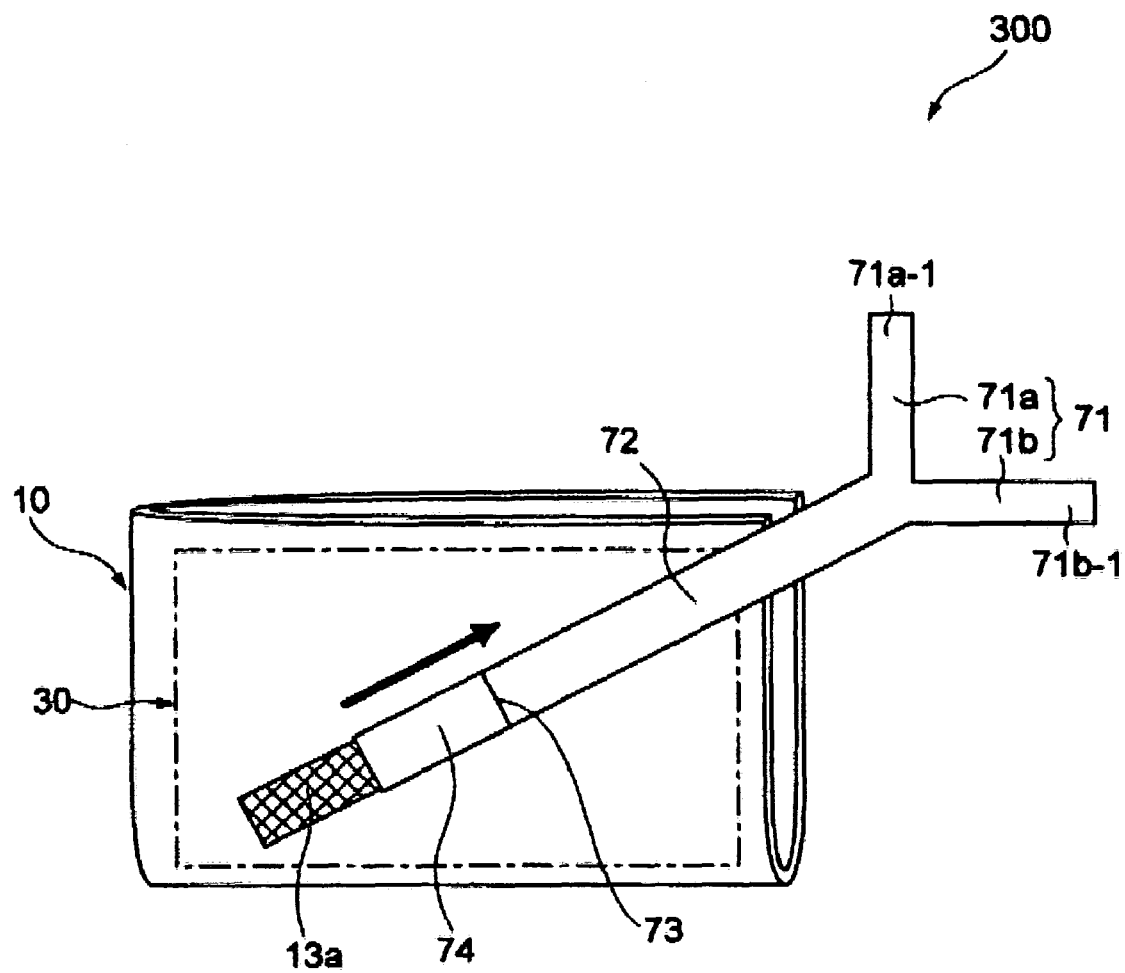
FIG. 16 is a view showing that a card user peels off a peeling section from an adhesive section in the third embodiment.
Figure 16:
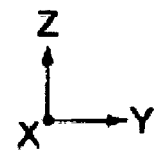

FIG. 16 is a view showing that the card user peels off the peeling section 74 from the adhesive section 13a. As described above, the folded-back section 72 of the card case 300 according to this embodiment is folded back from the peeling section 74. Accordingly, if the folded-back section 72 is moved in a folded-back direction (a direction facing the first corner 10g from the second corner 10h) after the sealing section 71 is peeled off from the rear surface 10b-1 and the seal of the openings 11a and 11b is taken off, it may be possible to peel off the peeling section 74 from the adhesive section 13a from the folding line 73.

Figure 17:
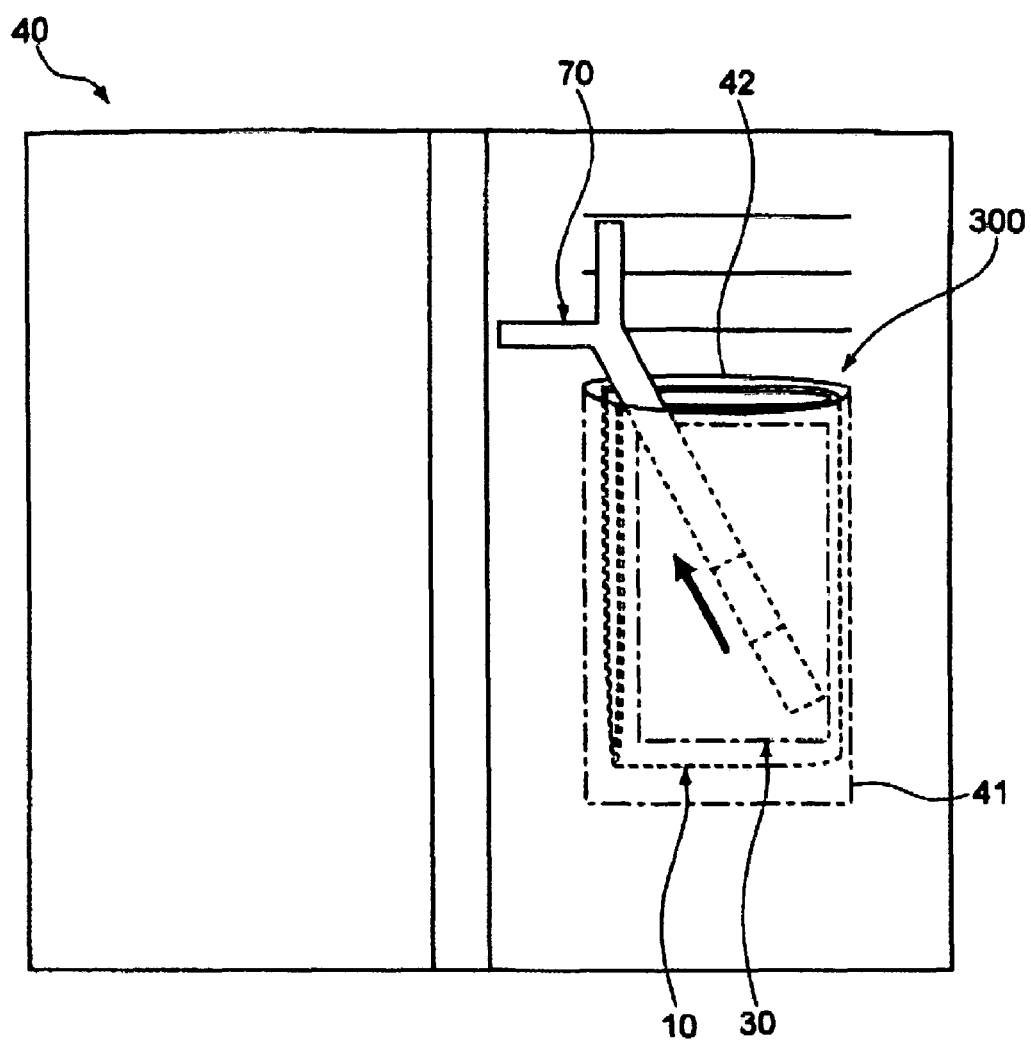
FIG. 17 is a view showing that a card user peels off a peeling section from an adhesive section after inserting a card case into a card storing section of a wallet, which is formed so that a noncontact IC card is taken out from and put in the wallet in a longitudinal direction, in the third embodiment.

FIG. 17 is a view showing that the card user peels off the peeling section 74 from the adhesive section 13a after inserting the card case 300 into the card storing section 41 of the wallet 40. Since the peeling section 74 can be peeled off from the folding line 73 as described above, the card user can peel off the peeling section 74 from the adhesive section 13a and make the adhesive section 13a be exposed after inserting the card case 300 into the card storing section 41 of the wallet 40.

Since the adhesive section 13a can be exposed after the insertion of the card case 300 as described above, it may be possible to prevent the card case 300 from being attached to a position of the card storing section 41 or 51 (see FIG. 9 or 10) that is not intended by the card user. That is, it may be possible to attach the card case 300 appropriately to an appropriate position on the inner surface of the card storing section 41 or 51.

In addition, according to this embodiment, the folded-back section 72 is disposed on the case main body 10 in the diagonal direction. Accordingly, even though the card storing section 41 or 51 is formed so that the noncontact IC card is taken out from and put in the card storing section in the longitudinal direction, or even though the card storing section is formed so that the noncontact IC card is taken out from and put in the card storing section in the transverse direction, it may be possible to peel off the peeling section 74 from the adhesive section 13a and make the adhesive section 13a be exposed while the card case 300 is inserted into the card storing section 41 or 51.

Fourth Embodiment

The fourth embodiment will be described below.

Figure 18:
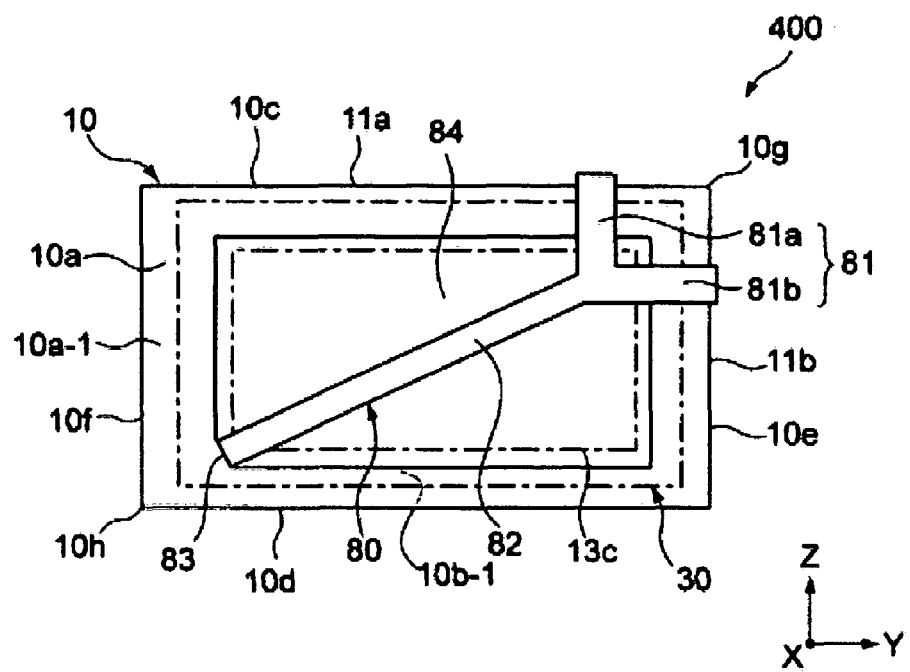
FIG. 18 is a plan view of a card case according to the fourth embodiment of the present invention.
Figure 19:
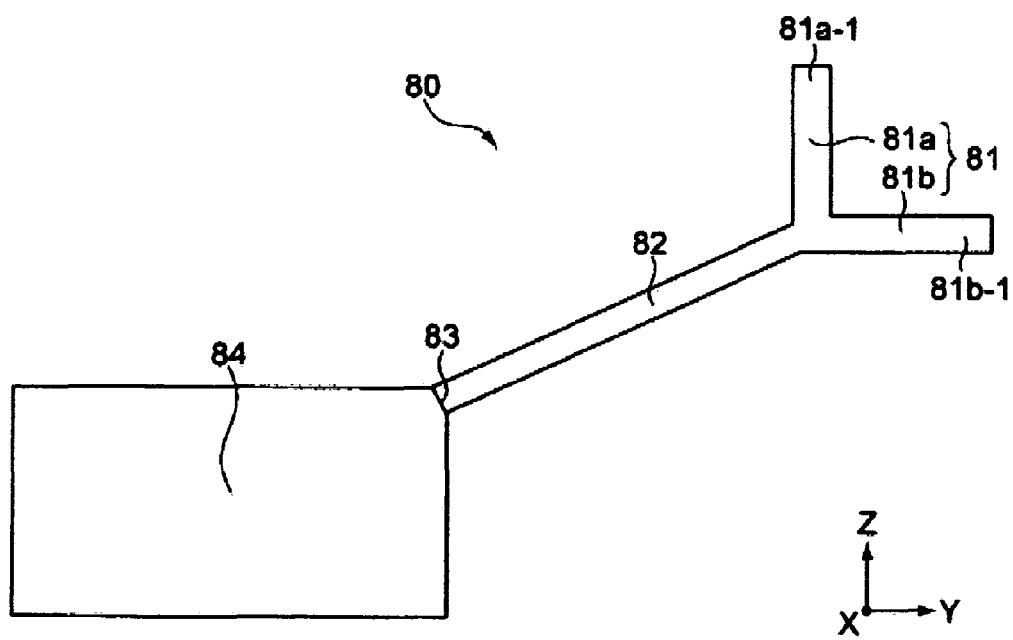
FIG. 19 is a development view of a sealing member of the card case according to the fourth embodiment.

FIG. 18 is a view showing a card case according to this embodiment, and FIG. 19 is a development view of a sealing member of the card case.

As shown in these drawings, a card case 400 according to this embodiment comprises the case main body 10 of the first embodiment and a sealing member 80.

In particular, since the sealing member 80 and the adhesive section provided on the case main body 10 of this embodiment are different from the sealing member and the adhesive section of the above-mentioned third embodiment, the sealing member 80 and the adhesive section will be mainly described.

As shown in FIG. 18, an adhesive section 13c is provided on the front surface 10a-1 of the case main body. The adhesive section 13c has a substantially rectangular shape, and has an area occupying most of the area of the front surface 10a-1. Accordingly, there is further improved an advantage of preventing the card case 400 from being deviated from the card storing section of the wallet.

As shown in FIG. 19, the sealing member 80 includes a peeling section 84, a folded-back section 82, and first and second sealing sections 81a and 81b.

The peeling section 84 has a substantially rectangular shape, and is detachably attached to the adhesive section 13c so as to cover the adhesive section 13c. The folded-back section 82 is folded back from the peeling section 84 by a folding line 83. The folded-back section 82 has a shape that is elongated in the diagonal direction (the direction facing the first corner 10g from the second corner 10h). The first and second sealing sections 81a and 81b are formed so as to be branched off from the end of the folded-back section 82. The first and second sealing sections 81a and 81b seal the openings 11a and 11b in the vicinity of the first corner 10g, respectively.

Figure 20:
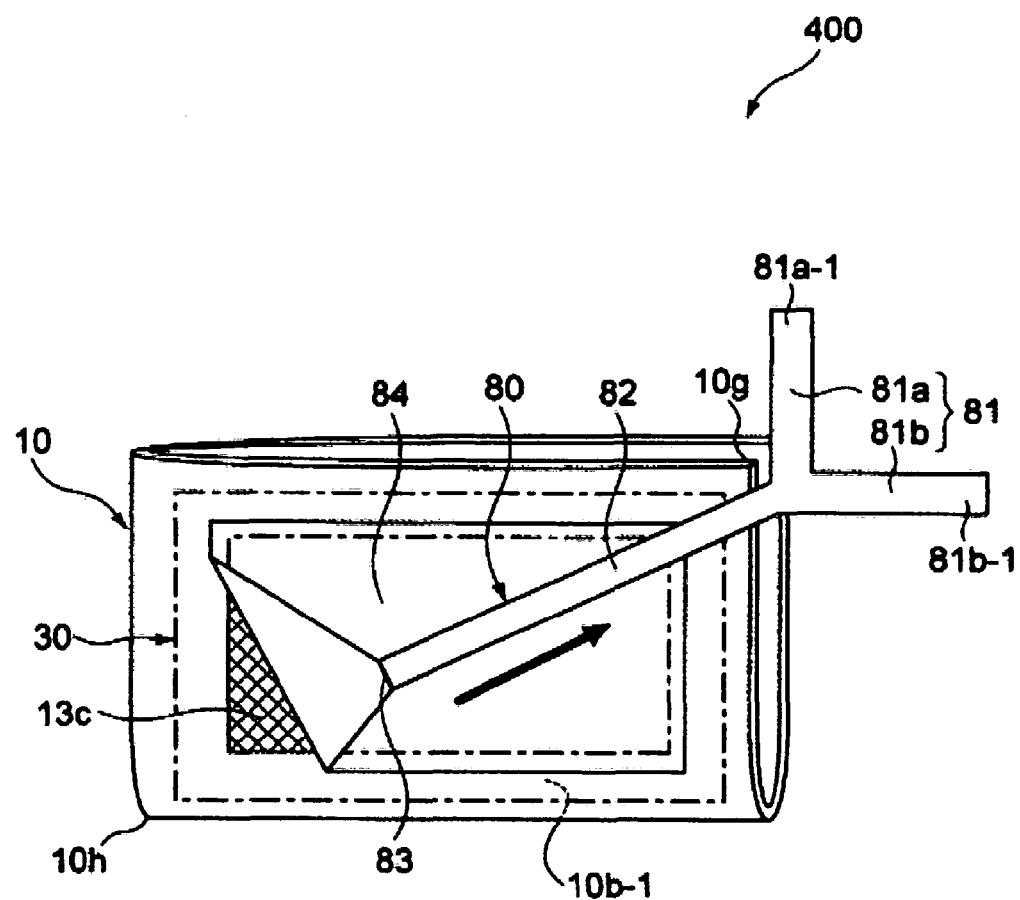
FIG. 20 is a view showing that a card user peels off a peeling section from an adhesive section in the fourth embodiment.

FIG. 20 shows that the card user peels off the peeling section 84 from the adhesive section 13c. The card user peels off the sealing section 81 from the rear surface 10b-1, and moves the sealing section 81 in the diagonal direction (the direction facing the first corner 10g from the second corner 10h) while grasping the sealing section 81. Accordingly, since it may be possible to peel off the peeling section 84 from the adhesive section 13c from the folding line 83, it may be possible to make the adhesive section 13c be exposed after inserting the card case 400 into, for example, the card storing section 41 or 51 of the wallet (see FIG. 9 or 10).

Meanwhile, the peeling section 84 and the adhesive section 13c of this embodiment have a substantially rectangular shape. However, it is preferable to increase the advantages of increasing the adhesive area of the adhesive section and preventing the card case 400 from being deviated from the card storing section 41 or 51 of the wallet, and the adhesive section 13c and the peeling section 84 may have a circular or elliptical shape.

Fifth Embodiment

The fifth embodiment will be described below.

Figure 21:
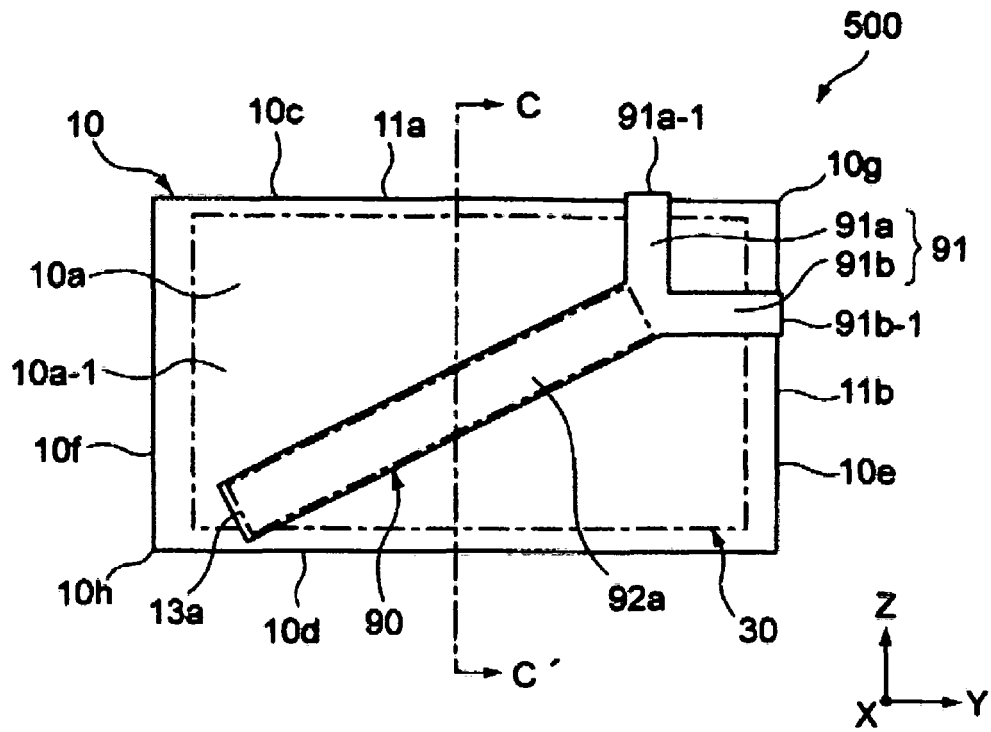
FIG. 21 is a plan view of a card case according to the fifth embodiment of the present invention.
Figure 22:
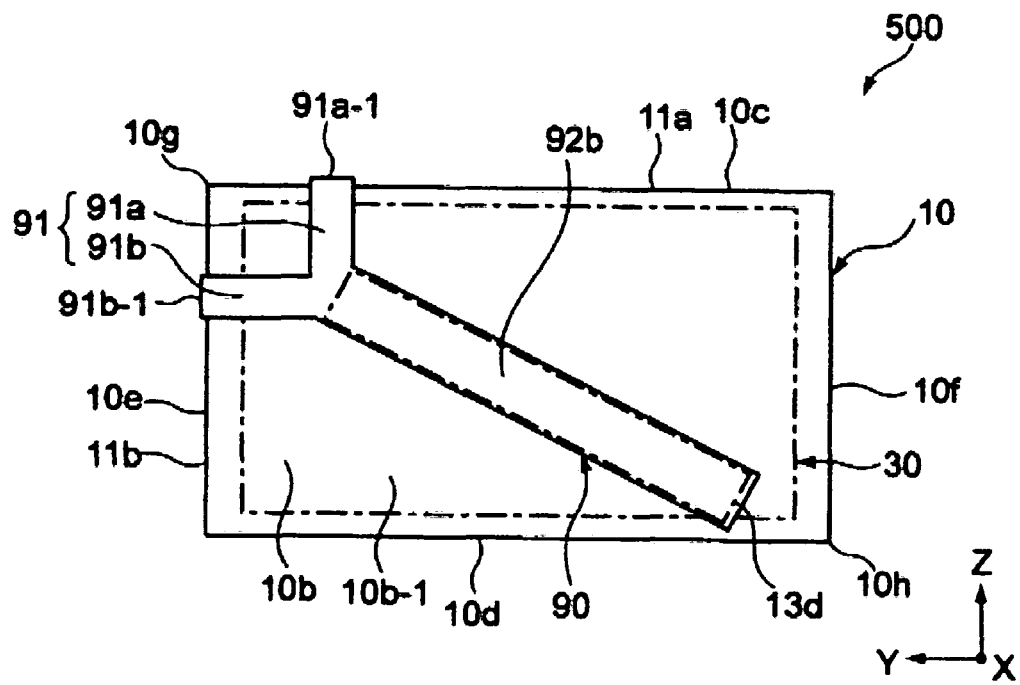
FIG. 22 is a rear view of the card case according to the fifth embodiment.
Figure 23:
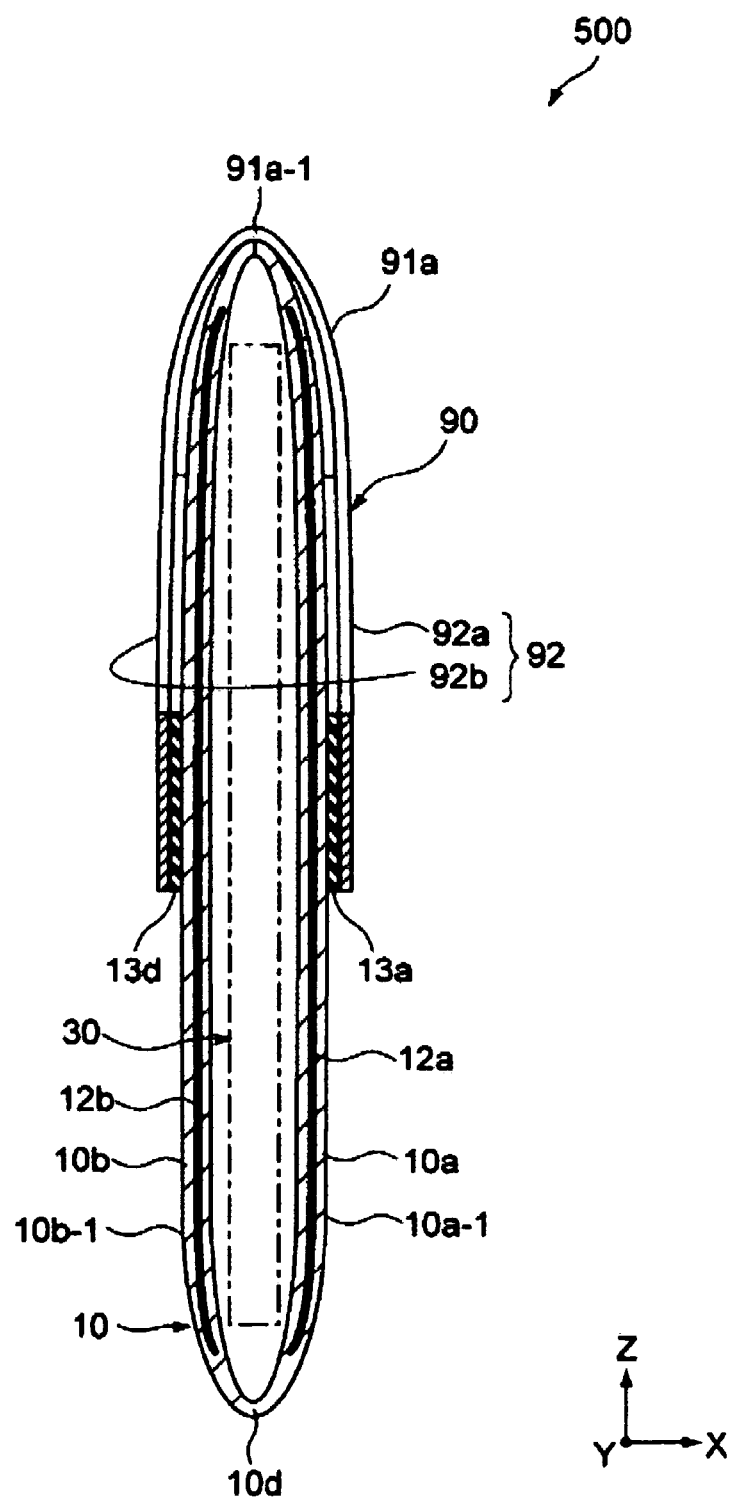
FIG. 23 is a cross-sectional view taken along a line C-C' shown in FIG. 21.

FIG. 21 is a plan view of a card case according to this embodiment, FIG. 22 is a rear view of the card case, and FIG. 23 is a cross-sectional view taken along a line C-C' shown in FIG. 21.

As shown in these drawings, a card case 500 according to this embodiment comprises the case main body 10 of the first embodiment and a sealing member 90.

Since the sealing member 90 and the adhesive section provided on the case main body of the card case 500 according to this embodiment are different from the sealing member and the adhesive section of the above-mentioned first embodiment, the sealing member and the adhesive section will be mainly described.

The first adhesive section 13a, which has a shape elongated in the diagonal direction (in the direction facing the second corner 10h from the first corner 10g), is provided on the front surface 10a-1 of the case main body. In addition, according to this embodiment, the second adhesive section 13d, which has a shape elongated in the diagonal direction, is provided even on the rear surface 10b-1. Since the second adhesive section 13d is provided even on the rear surface 10b-1 as described above, there is further improved an advantage of preventing the card case 500 from being deviated from the card storing section 41 or 51 of the wallet 40 or 50 (see FIG. 9 or 10).

The sealing member 90 includes the first peeling section 92a, the second peeling section 92b, the first sealing section 91a, and the second sealing section 91b.

The first peeling section 92a has a shape elongated in the diagonal direction (in the direction facing the second corner 10h from the first corner 10g), and is detachably attached to the first adhesive section 13a so as to cover the first adhesive section 13a. Likewise, the second peeling section 92b also has a shape elongated in the diagonal direction, and is detachably attached to the second adhesive section 13d so as to cover the second adhesive section 13d. The first and second sealing sections 91a and 91b are branched off from the end of each of the first and second peeling sections 92a and 92b. The first sealing section 91a is folded back by a folding line 91a-1 of the first sealing section 91a, and seals the opening 11a, which is formed at the upper edge portion 10c, in the vicinity of the first corner 10g. The second sealing section 91b is folded back by a folding line 91b-1 of the second sealing section 91b, and seals the opening 11b, which is formed at the right edge portion 10e, in the vicinity of the first corner 10g.

The card user separates the first sealing section 91a at the folding line 91a-1 of the first sealing section by, for example, a finger, scissors, a paper knife, and the like. Further, the card user also separates the second sealing section 91b at the folding line 91b-1 of the second sealing section. Here, a cut may be formed at each of the folding lines 91a-1 and 91b-1 of the first and second sealing sections 91a and 91b in order to facilitate the separation.

The card user makes the first adhesive section 13a be exposed by separating the sealing section 91 and moving the sealing section 91 in the diagonal direction (in the direction facing the second corner 10h from the first corner 10g) while grasping the sealing section 91 separated in a direction facing the front surface 10a-1. Further, the card user makes the second adhesive section 13d be exposed by moving the sealing section 91 in the diagonal direction while grasping the sealing section 91 separated in a direction facing the rear surface 10b-1. Then, the card user can prevent skimming by inserting the card case 500 into, for example, the card storing section 41 or 51 of the wallet (see FIG. 9 or 10).

The above-mentioned card case is not limited to each of the embodiments, and may be modified in various ways.

For example, the metal films have been provided in the front and rear members of the case main body in each of the embodiments. However, the case main body may be made of fabric or the like, which is woven with metal fiber, so as to shield from electromagnetic waves. Alternatively, the case main body may be made of other materials that can shield from electromagnetic waves.

The sealing member 60 of the second embodiment is formed so that the peeling section 62 and the sealing section 61 are connected to each other. However, a folded-back section folded back from the peeling section 62 may be provided between the peeling section 62 and the sealing section 61.

Alternatively, two or more sealing members 60 of the second embodiment may be attached to the case main body 10 of the first and third to fifth embodiments. In this case, for example, two sealing members 60 are disposed so as to extend in a vertical direction (Z direction of FIG. 1) and a horizontal direction (Y direction of FIG. 1). The two sealing members 60 seal the openings 11a and 11b that are formed at the upper and right edge portions 10c and 10e of the case main body 10, respectively.

Further, at least one of the first and second adhesive sections 13a and 13d of the fifth embodiment is formed as an adhesive section that has a rectangular shape and a large area like the adhesive section 13c of the fourth embodiment. Alternatively, a folded-back section may be formed at least one of the first and second peeling sections 92a and 92b.

The invention claimed is:

1. A card case in which a noncontact IC card including an antenna is contained and which is attached to an inner surface of a card storing section, the card case comprising:
   a case main body including openings through which the noncontact IC card is taken out of and put in the case main body;
   shielding parts that are provided in the case main body and shield from electromagnetic waves transmitted and received by the antenna;
   an adhesive section that includes first and second ends, is formed at the case main body, and is attached to the inner surface of the card storing section, the first end being close to the openings and the second end being not close to the openings and opposite to the first end;
   a sealing member including a peeling section that is detachably attached to the adhesive section so as to cover the adhesive section, a folded-back section that is folded back from the peeling section toward the openings at the second end so as to overlap the peeling section, and sealing sections that are provided on the folded-back section and seal the openings.

2. A card case in which a noncontact IC card including an antenna is contained and which is attached to an inner surface of a card storing section, the card case comprising:
   a case main body including openings through which the noncontact IC card is taken out of and put in the case main body;
   shielding parts that are provided in the case main body and shield from electromagnetic waves transmitted and received by the antenna;
   an adhesive section that includes first and second ends, is formed at the case main body, and is attached to the inner surface of the card storing section, the first end being close to the openings and the second end being not close to the openings and opposite to the first end;
   a sealing member including a peeling section that is detachably attached to the adhesive section so as to cover the adhesive section, a folded-back section that is folded back from the peeling section toward the openings at the second end so as to overlap the peeling section, and sealing sections that are provided on the folded-back section and seal the openings, wherein the case main body further includes a first edge portion that has a first length, a second edge portion that is adjacent to the first edge portion and has a second length longer than the first length, a first corner where the first and second edge portions are connected to each other, and a second corner that is positioned opposite to the first corner on a diagonal line,
   the openings are formed to continue to the first and second edge portions,
   the first end is close to the openings at the first corner,
   the second end is disposed at the second corner,
   the folded-back section is folded back from the peeling section toward the first corner at the second corner, and
   the sealing sections seal the openings of the first and second edge portions at the first corner.

3. The card case according to claim 2, wherein the adhesive section has a shape that is elongated in a direction from the first corner toward the second corner.

4. The card case according to claim 2, wherein the sealing sections are formed so as to branch.

5. The card case according to claim 2, wherein the case main body includes a front surface, and the adhesive section has an area occupying most of the front surface.

6. A card case in which a noncontact IC card including an antenna is contained and which is attached to an inner surface of a card storing section, the card case comprising:
- a case main body that includes a front surface, a rear surface that is opposite to the front surface, and openings that are formed so as to partition the front and rear surfaces, the noncontact IC card being taken out of and put in the case main body through the openings;
- shielding parts that are provided in the case main body and shield from electromagnetic waves transmitted and received by the antenna;
- a first adhesive section that includes first and second ends, is formed on the front surface, and is attached to the inner surface of the card storing section, the first end being close to the openings and the second end being not close to the openings and opposite to the first end;
- a second adhesive section that includes the first and second ends, is formed on the rear surface, and is attached to the inner surface of the card storing section, the first end being close to the openings and the second end being not close to the openings and opposite to the first end; and
- a sealing member including first and second peeling sections that are detachably attached to the first and second adhesive sections so as to cover the first and second adhesive sections, a first folded-back section that is folded back from the first peeling section toward the openings at the second end of the first adhesive section so as to overlap the first peeling section, a second folded-back section that is folded back from the second peeling section toward the openings at the second end of the second adhesive section so as to overlap the second peeling section, and sealing sections that are provided so as to connect the first and second folded-back sections and seal the opening by being folded back from the front surface toward the rear surface.

7. The card case according to claim 6, wherein the case main body further includes a first edge portion that has a first length, a second edge portion that is adjacent to the first edge portion and has a second length longer than the first length, a first corner where the first and second edge portions are connected to each other, and a second corner that is positioned opposite to the first corner on a diagonal line,
- the openings are formed to continue to the first and second edge portions,
- the first ends of the first and second adhesive sections are close to the openings at the first corner, respectively,
- the second ends of the first and second adhesive sections are disposed at the second corner, respectively,
- the first and second folded-back sections are folded back from the first and second peeling sections toward the first corner at the second corner, respectively, and
- the sealing sections seal the openings of the first and second edge portions at the first corner, respectively.

8. The card case according to claim 7, wherein each of the first and second adhesive sections has a shape elongated in a direction facing the second corner from the first corner.

9. A card case in which a noncontact IC card including an antenna is contained and which is attached to an inner surface of a card storing section, the card case comprising:
- a case main body including openings through which the noncontact IC card is taken out of and put in the case main body;
- shielding parts that are provided in the case main body and shield from electromagnetic waves transmitted and received by the antenna;
- an adhesive section that includes first and second ends, is formed at the case main body, and is attached to the inner surface of the card storing section, the first end being close to the openings and the second end being not close to the openings and opposite to the first end;
- a sealing member including a peeling section that is detachably attached to the adhesive section so as to cover the adhesive section, a folded-back section that is folded back from the peeling section toward the openings at the second end so as to overlap the peeling section, and sealing sections that are provided on the folded-back section and seal the openings,
- wherein the case main body further includes a first edge portion that has a first length, a second edge portion that is adjacent to the first edge portion and has a second length longer than the first length, and the openings are formed to continue to the first and second edge portions.

* * * * *